US010382340B1

(12) United States Patent
Das et al.

(10) Patent No.: US 10,382,340 B1
(45) Date of Patent: Aug. 13, 2019

(54) DYNAMIC FILTERING OF NETWORK TRAFFIC

(71) Applicant: Juniper Networks, Inc., Sunnyvale, CA (US)

(72) Inventors: Ranadip Das, Fremont, CA (US); Rekha Duthulur, San Jose, CA (US); Chetan D. Kothari, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/893,292

(22) Filed: Feb. 9, 2018

(51) Int. Cl.
*H04L 12/801* (2013.01)
*H04L 12/851* (2013.01)
*H04L 12/26* (2006.01)

(52) U.S. Cl.
CPC .......... *H04L 47/24* (2013.01); *H04L 43/0894* (2013.01); *H04L 43/16* (2013.01)

(58) Field of Classification Search
None
See application file for complete search history.

(56) References Cited

U.S. PATENT DOCUMENTS

| 7,177,311 | B1 | 2/2007 | Hussain et al. |
| 9,246,828 | B1 | 1/2016 | Tagore |
| 9,444,768 | B1 | 9/2016 | Raghunathan et al. |
| 2011/0238855 | A1* | 9/2011 | Korsunsky .............. G06F 21/55 709/231 |
| 2015/0312273 | A1* | 10/2015 | Pappu ................. H04L 63/1416 726/23 |
| 2017/0118041 | A1* | 4/2017 | Bhattacharya ........ H04L 12/462 |
| 2017/0289186 | A1* | 10/2017 | Staniford ............ H04L 63/1425 |
| 2018/0349583 | A1* | 12/2018 | Turgeman ............ H04W 12/06 |

OTHER PUBLICATIONS

Juniper, "DOS Attack Prevention on a Juniper M/T-Series Router", https://kb.juniper.net/library/CUSTOMERSERVICE/technotes/DOS_prevention.pdf, Jun. 30, 2012, 26 pages.

* cited by examiner

*Primary Examiner* — Eunsook Choi
(74) *Attorney, Agent, or Firm* — Harrity & Harrity, LLP

(57) ABSTRACT

A device may include one or more memories, and one or more processors to receive a plurality of packets over a network. Packets, of the plurality of packets, may relate to a subscriber. The subscriber may be a source subscriber from which the packets are initiated or a destination subscriber to which the packets are destined. The device may determine whether a rate of receipt of the packets satisfies a first threshold, detect whether a level of processor usage satisfies a second threshold, and perform one or more actions to cause filtering of additional packets relating to the subscriber based on whether the rate of receipt of the packets satisfies the first threshold and based on whether the level of processor usage satisfies the second threshold. The device may monitor filtering of the additional packets to determine whether to filter further packets relating to the subscriber.

20 Claims, 9 Drawing Sheets

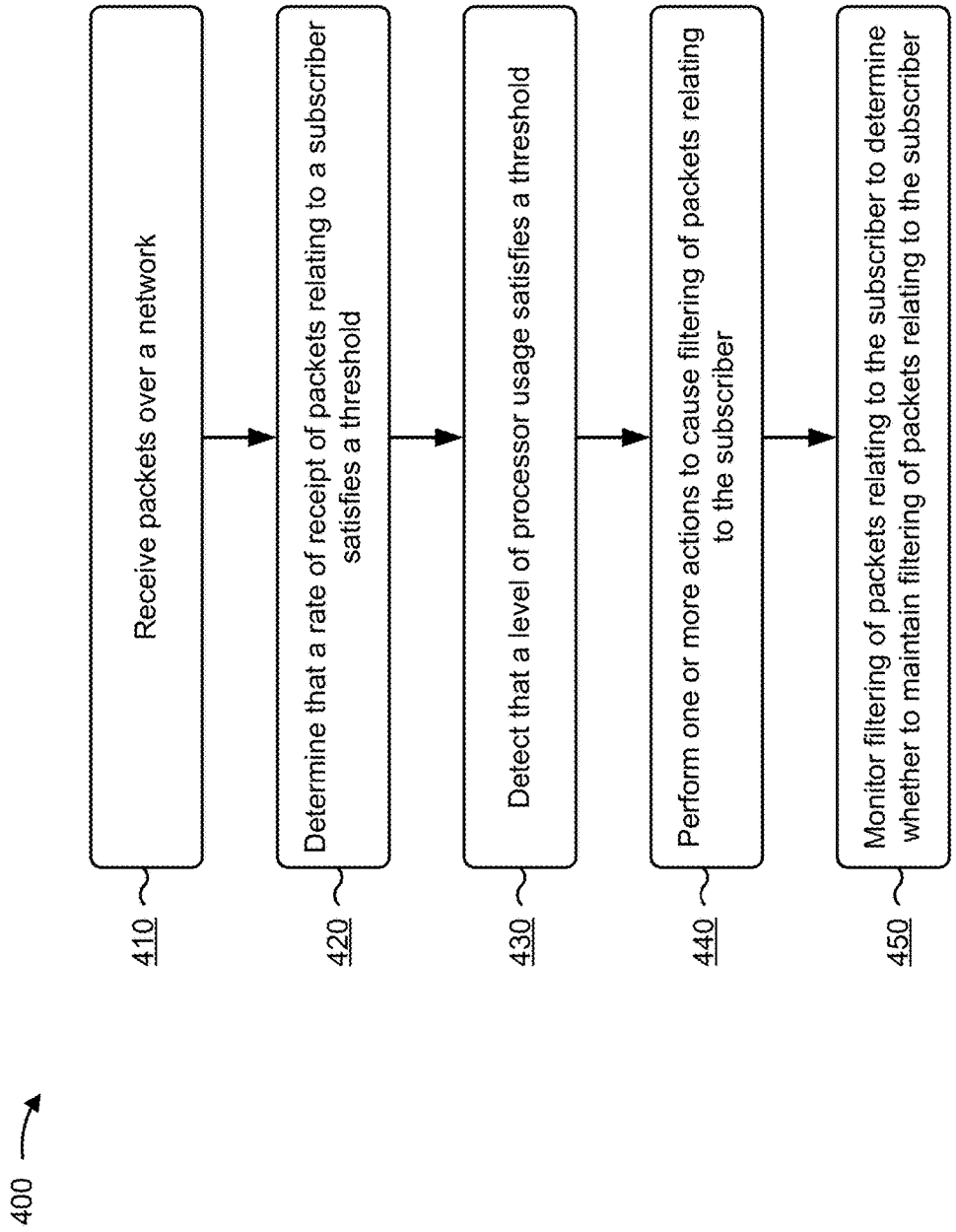

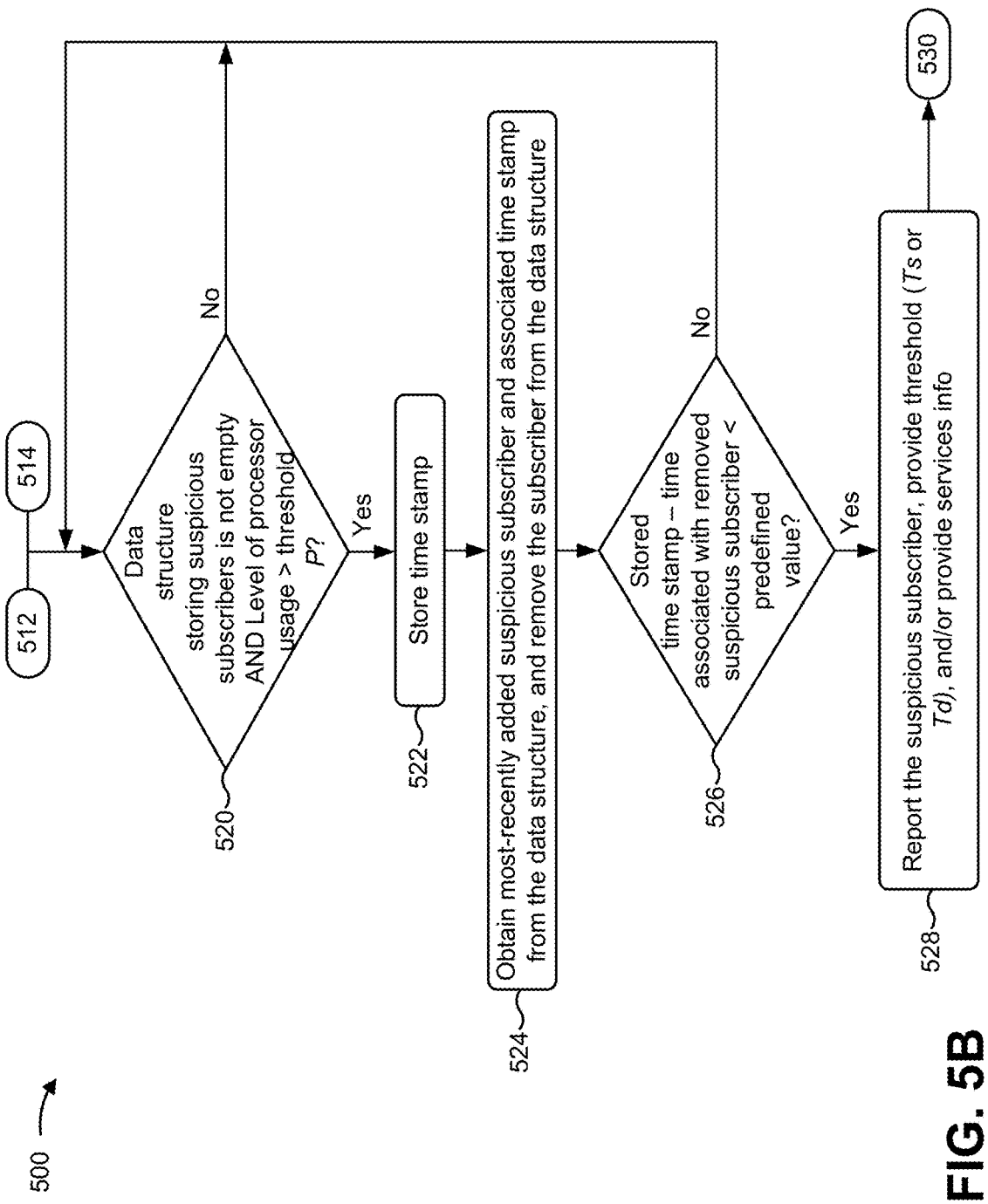

DYNAMIC FILTERING OF NETWORK TRAFFIC

BACKGROUND

Hackers often target computing systems by launching malicious attacks over a network. Such attacks include Denial of Service (DoS) attacks, where a large volume of network traffic is used to overwhelm a target system by sending large quantities of packets to multiple devices at the target system, and Distributed Denial of Service (DDoS) attacks, where multiple sources are used to flood a single device at the target system.

SUMMARY

According to some implementations, a device may include one or more memories, and one or more processors to receive a plurality of packets over a network. Packets, of the plurality of packets, may relate to a subscriber. The subscriber may be a source subscriber from which the packets are initiated or a destination subscriber to which the packets are destined. The device may determine whether a rate of receipt of the packets satisfies a first threshold, detect whether a level of processor usage satisfies a second threshold, and perform one or more actions to cause filtering of additional packets relating to the subscriber based on whether the rate of receipt of the packets satisfies the first threshold and based on whether the level of processor usage satisfies the second threshold. The device may monitor filtering of the additional packets to determine whether to filter further packets relating to the subscriber.

According to some implementations, a non-transitory computer-readable medium may store one or more instructions that, when executed by one or more processors, cause the one or more processors to process a plurality of packets received over a network. Packets, of the plurality of packets, may relate to a subscriber. The subscriber may be a source subscriber from which the packets are initiated or a destination subscriber to which the packets are destined. The one or more instructions, when executed by one or more processors, may cause the one or more processors to determine that a rate of receipt of the packets satisfies a first threshold. The one or more instructions, when executed by one or more processors, may cause the one or more processors to detect that a level of processor usage satisfies a second threshold, perform one or more actions to cause blocking of additional packets relating to the subscriber based on determining that the rate of receipt of the packets satisfies the first threshold and/or based on detecting that the level of processor usage satisfies the second threshold, and monitor blocking of the additional packets to determine whether to block further packets relating to the subscriber.

According to some implementations, a method may include receiving, by a device, a plurality of packets over a network. The device may include a controller, a packet forwarding component to process or forward one or more of the plurality of packets, and a service component to provide one or more services relating to one or more of the plurality of packets. The method may include determining, by the device, whether a rate of receipt of packets, of the plurality of packets and relating to a subscriber, satisfies a first threshold. The subscriber may be a source subscriber from which the packets are initiated or a destination subscriber to which the packets are destined. The method may include detecting, by the device, whether a level of processor usage satisfies a second threshold, providing, by the device, a filter to filter additional packets relating to the subscriber based on whether the rate of receipt of the packets satisfies the first threshold or based on whether the level of processor usage satisfies the second threshold, and maintaining or disabling, by the device, the filter based on an activity of the filter associated with the additional packets.

BRIEF DESCRIPTION OF THE DRAWINGS

FIG. 4 is a flow chart of an example process for dynamic filtering of network traffic; and FIGS. 5A-5C are diagrams of an example process relating to the example process shown in FIG. 4.

DETAILED DESCRIPTION

The following detailed description of example implementations refers to the accompanying drawings. The same reference numbers in different drawings may identify the same or similar elements.

Certain network devices, such as routers and firewalls, play a major role in facilitating traffic over a network. In addition to forwarding incoming traffic to the appropriate devices, some network devices include one or more service components that provide services to packets. In some cases, a network device may be incapable of protecting a target system from an attack, particularly if the attack is carried out at a high rate (e.g., a line rate attack), where a large quantity of packets, for example, is transmitted over a short period of time. In addition, such an attack may affect the operation of the network device. For example, such an attack may consume computing resources and/or processing resources of one or more service components of the network device, and may even temporarily render the service components inoperable.

Some implementations, described herein, provide a device (e.g., a network device) that is capable of thwarting malicious attacks conducted over a network by using one or more firewall filters dynamically provided based on the rate of incoming traffic (e.g., incoming packets) associated with a source or destination that may be involved in a potential attack and/or based on an amount of processing resources being used during such a potential attack. In this way, the device dynamically adjusts to potential attacks as needed. This reduces or eliminates a need to process and/or forward packets related to a potential attack, which conserves processing and/or memory resources of the device, and permits the device, including various components of the device, such as one or more service components, to remain operational and continue providing services for other packets that are received. In addition, this maintains the integrity of the network, reduces the likelihood that a target system of the attack will become inoperable, and/or reduces or eliminates a need for a network or system administrator to intervene (such as to restart the device and/or one or more device(s) at the target system).

Figure 1A:
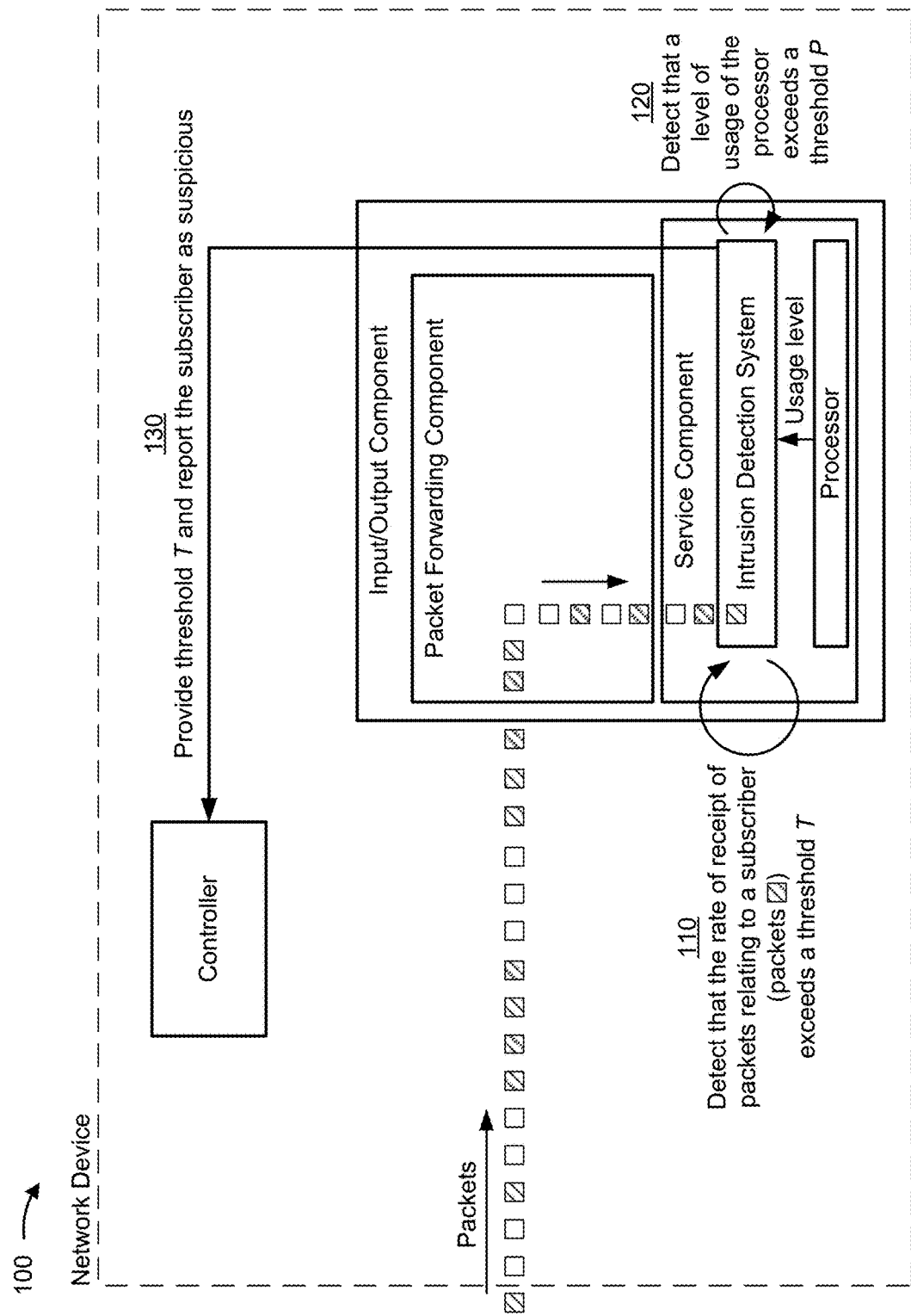
FIGS. 1A-1C are diagrams of an overview of an example implementation described herein.
Figure 1B:
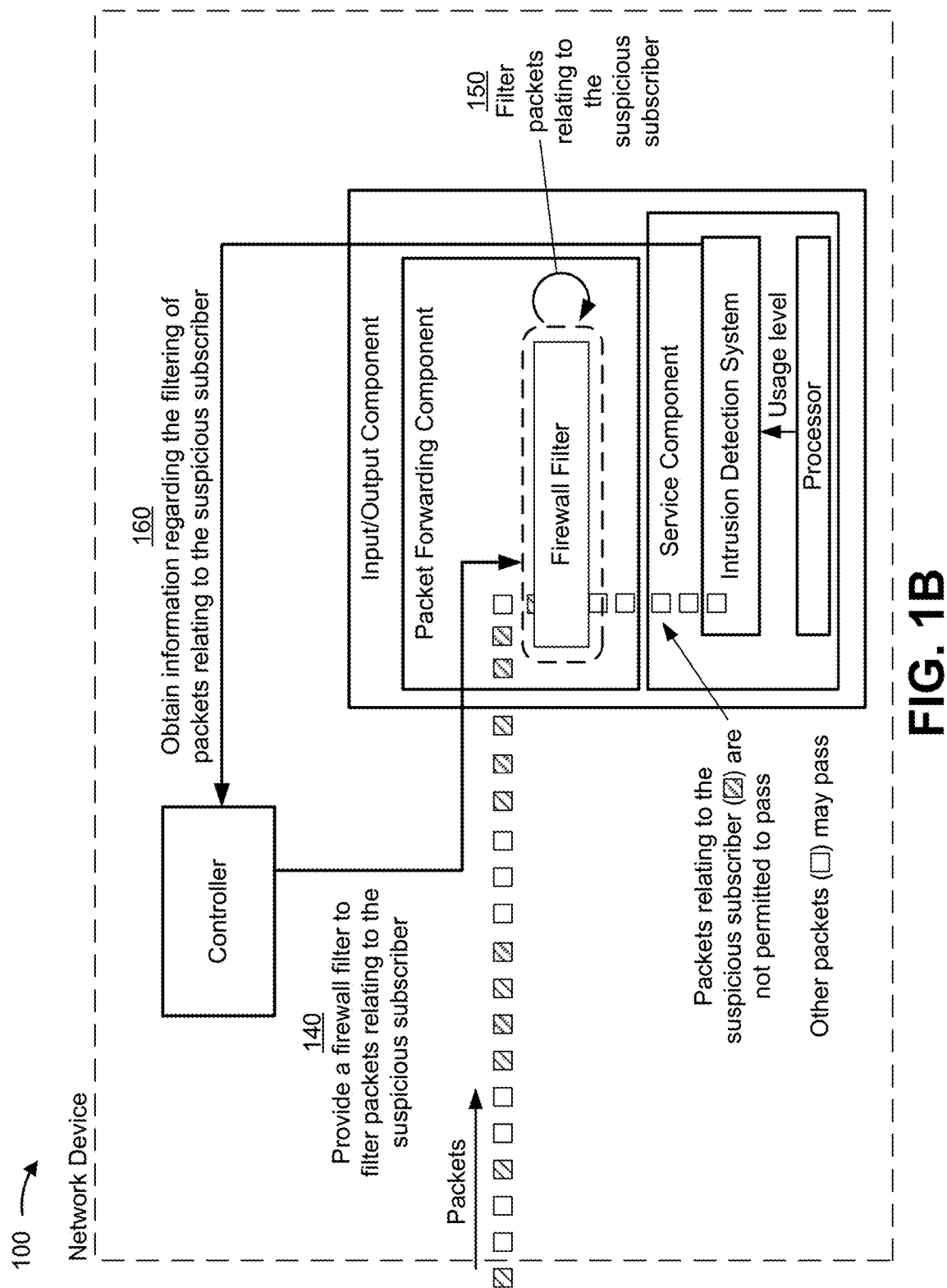
Figure 1C:
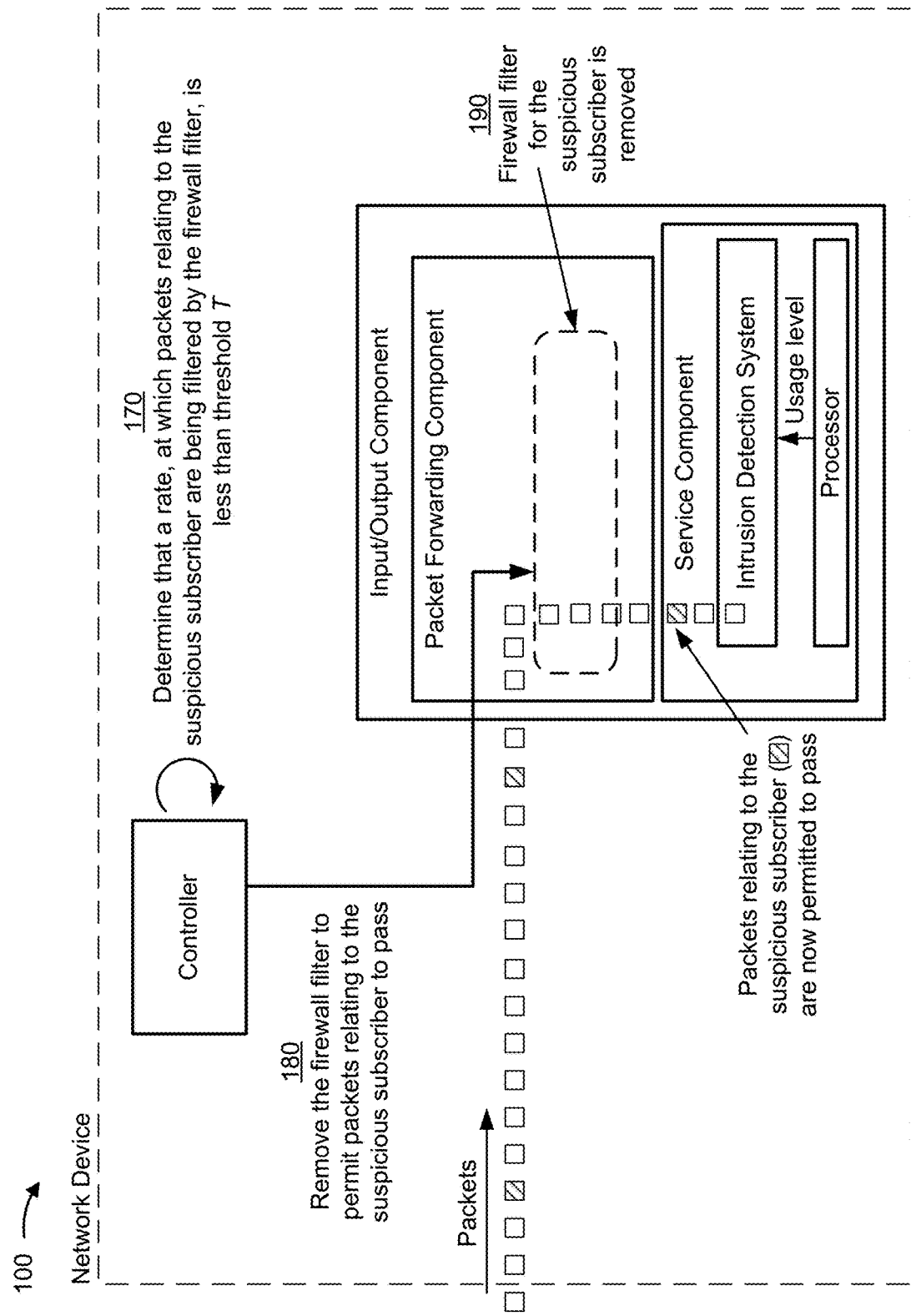

FIGS. 1A-1C are diagrams of an overview of an example implementation 100 described herein. As shown in FIGS. 1A-1C, a network device (e.g., a router, a switch, a firewall, and/or the like) may include a controller and an input/output component. As shown, the input/output component may include a packet forwarding component that can receive, process, and/or forward packets. The controller may provide routing information to the input/output component (e.g., to the packet forwarding component) to facilitate packet processing and/or forwarding.

As shown, the input/output component may include a service component that can provide one or more services to received packets (e.g., a firewall service, an Internet Protocol Security (IPSec) service, a deep-packet inspection (DPI) service, a network address translation (NAT) service, a virus scan service, and/or the like). As shown, the service component may include a processor, and may include and/or provide an intrusion detection system or device (e.g., implemented as a service executed in the service component) that can monitor packet flows for suspicious activities, such as potential attacks. In some implementations, the service component may be implemented as one or more application-specific integrated circuits (ASICs) that include the processor and/or memory.

As shown in FIG. 1A, and as shown by reference number 110, the intrusion detection system may detect that the rate of receipt of packets relating to a subscriber satisfies a threshold T (e.g., exceeds a threshold T). In some implementations, the subscriber may be an address associated with a communication protocol, such as an Internet Protocol (IP) address. In some implementations, the subscriber may be a source from which packets are initiated (e.g., a source subscriber) or a destination to which packets are destined (e.g., a destination subscriber).

In some implementations, threshold T may be set or configured by a user (e.g., a system administrator, a network administrator, and/or the like). Additionally, or alternatively, threshold T may be set or configured by the network device.

In some implementations, threshold T may be a maximum rate at which packets, relating to any given subscriber (e.g., any given source subscriber or any given destination subscriber), are permitted to be received by the service component. Here, for example, the intrusion detection system may compare the rate of receipt of packets, relating to a subscriber, and the maximum rate, and detect that the rate of receipt satisfies (e.g., exceeds) the maximum rate. In this way, the intrusion detection system can use threshold T to identify source subscribers that are sending packets at a high rate and/or destination subscribers that are receiving packets at a high rate.

As shown by reference number 120, the intrusion detection system may detect that a level of usage of the processor satisfies (e.g., exceeds) a threshold P. In some implementations, threshold P may be a maximum permitted level of usage of the processor. In some implementations, threshold P may be used in conjunction with threshold T to determine whether a high rate of receipt of packets relating to a subscriber (e.g., a source subscriber or a destination subscriber) is likely causing the processor to overload, and thus may need to be addressed. For example, a high rate of receipt of packets relating to a subscriber may be permissible, so long as the high rate of receipt does not cause the processor to become overloaded. In contrast, a high rate of receipt of packets relating to a subscriber may become undesirable, if the high rate of receipt causes the processor to overload, since this may affect the processor's ability to process packets relating to other subscribers (e.g., existing processor flows relating to other subscribers may become disrupted and/or the processor may suspend and/or terminate flow creation altogether). Here, for example, the intrusion detection system may compare the level of usage of the processor and the maximum permitted level, and detect that the level of usage satisfies (e.g., exceeds) the maximum permitted level.

As shown by reference number 130, the intrusion detection system may provide the value of threshold T to the controller, and report the subscriber as suspicious. For example, the intrusion detection system may determine that the subscriber is suspicious based on detecting that the rate of receipt of packets relating to the subscriber satisfies threshold T (e.g., exceeds threshold T, and thus the rate of receipt of packets is high) and that the level of usage of the processor satisfies threshold P (e.g., exceeds threshold P, and thus the processor is becoming overloaded). The intrusion detection system may provide the value of threshold T to the controller for control purposes, as described below.

As shown in FIG. 1B, and as shown by reference number 140, the controller may provide, to the packet forwarding component, a firewall filter to filter packets relating to the suspicious subscriber. For example, the controller may install a firewall filter in the packet forwarding component to prevent packets relating to the suspicious subscriber from proceeding to the service component. As shown by reference number 150, as packets are received, the firewall filter may filter packets relating to the suspicious subscriber. For example, in a case where the suspicious subscriber is a source subscriber, the firewall filter may filter (e.g., discard, block, reject, quarantine, subject to further analysis, and/or the like) incoming packets that are initiated by or from the source subscriber. As another example, in a case where the suspicious subscriber is a destination subscriber, the firewall filter may filter (e.g., discard, block, reject, quarantine, subject to further analysis, and/or the like) incoming packets that are destined to or for the destination subscriber. As shown, the firewall filter may prevent packets relating to the suspicious subscriber from passing to the service component, while permitting other packets unrelated to the suspicious subscriber to pass to the service component.

As shown by reference number 160, the controller may obtain information regarding the filtering of packets relating to the suspicious subscriber. For example, the controller may obtain information on the quantity of packets, relating to the suspicious subscriber, that are filtered by the firewall filter over a period of time. As shown in FIG. 1C, and as shown by reference number 170, the controller may determine that a rate, at which packets relating to the suspicious subscriber are being filtered by the firewall filter, satisfies threshold T (e.g., is less than threshold T). For example, the controller may determine that the rate, at which packets relating to the suspicious subscriber are being filtered, is low (e.g., is less than or equal to the maximum rate at which packets, relating to any given subscriber, are permitted to be received), which may indicate that a potential attack involving the suspicious subscriber has ended, since fewer packets relating to the subscriber are being received and filtered.

As shown by reference numbers 180 and 190, the controller may remove (e.g., uninstall, suspend, disable, and/or the like) the firewall filter to permit packets relating to the suspicious subscriber to pass. As shown, packets relating to the suspicious subscriber may then pass from the packet forwarding component to the service component.

By providing one or more firewall filters based on the rate of incoming traffic (e.g., packets) associated with a subscriber that may be involved in a potential attack and/or based on an amount of processing resources being used during such a potential attack, the network device thwarts malicious attacks conducted over a network. In this way, the network device may dynamically adjust to potential attacks as needed. This reduces or eliminates a need to process and/or forward packets related to a potential attack, which conserves processing and/or memory resources of the network device, and permits the network device, including various components of the network device, such as one or more service components and/or processors associated with the service components, to remain operational and continue providing services for packets relating to other subscribers and/or addressing other attacks, such as lower rate attacks. In addition, this maintains the integrity of the network, reduces the likelihood that a target system of the attack will become inoperable, and/or reduces or eliminates a need for a network or system administrator to intervene (such as to restart the device and/or one or more device(s) at the target system).

As indicated above, FIGS. 1A-1C are provided merely as an example. Other examples are possible and may differ from what was described with regard to FIGS. 1A-1C. Although some implementations are described herein with respect to the Internet Protocol, the implementations described herein apply similarly or equally to other communication protocols (e.g., Transmission Control Protocol (TCP), Internet Control Message Protocol (ICMP), and/or the like).

Figure 2:
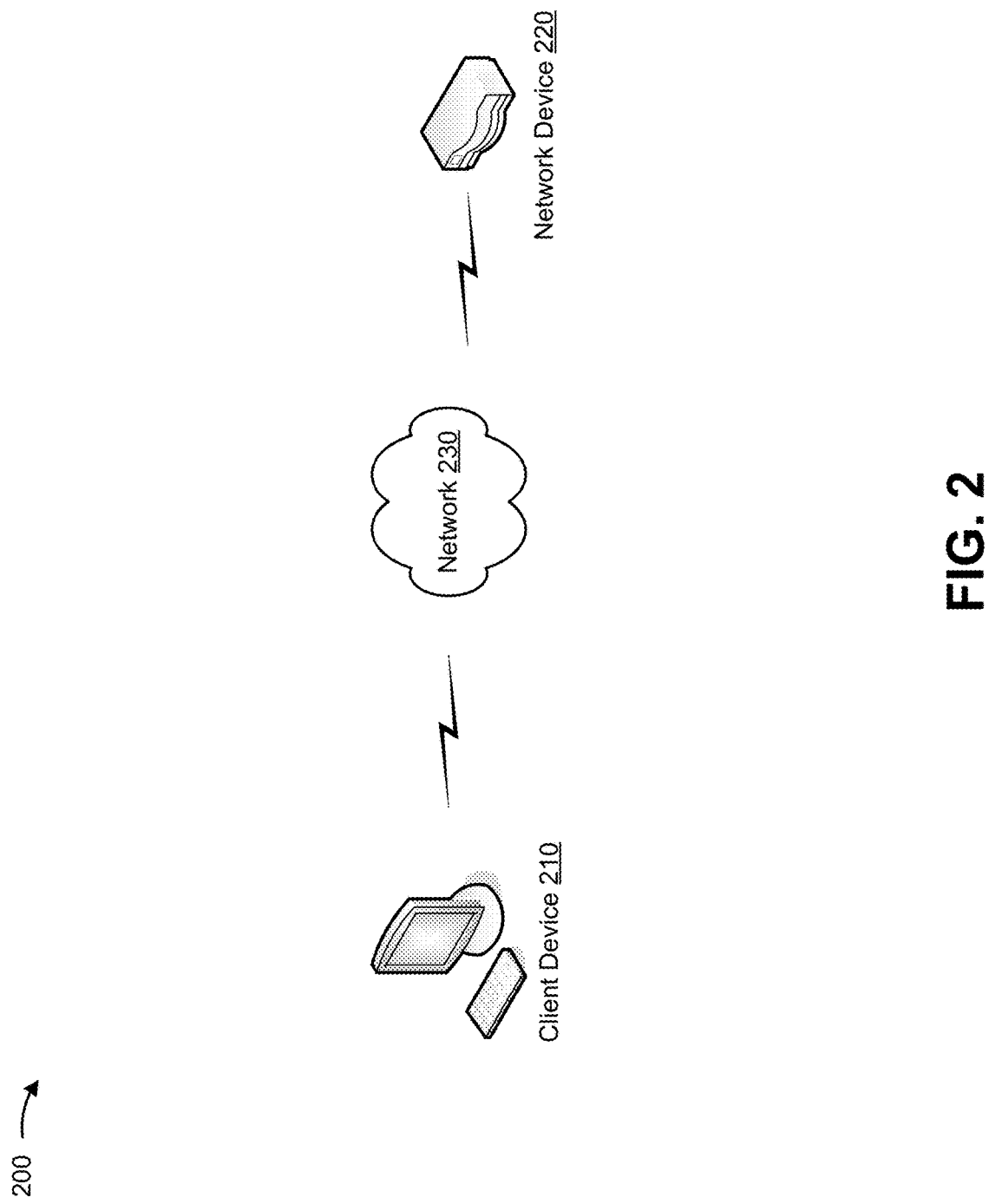
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network device 220, and a network 230. Devices of environment 200 may interconnect via wired connections, wireless connections, or a combination of wired and wireless connections.

Client device 210 includes one or more devices capable of receiving, generating, storing, processing, and/or providing information. For example, client device 210 may include a communication and/or computing device, such as a desktop computer, a laptop computer, a tablet computer, a server device (e.g., in a data center or in a cloud computing environment), a mobile phone (e.g., a smart phone or a radiotelephone), a gaming device, a wearable communication device (e.g., a smart wristwatch, a pair of smart eyeglasses, or a smart activity band), or a similar type of device.

Network device 220 may include one or more devices capable of receiving and/or providing information over a network (e.g., network 230), and/or capable of generating, storing, and/or processing information received and/or provided over the network. For example, network device 220 may include a router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. In some implementations, network device 220 may be a physical device implemented within a housing, such as a chassis. In some implementations, network device 220 may be a virtual device implemented by one or more computer devices of a cloud computing environment or a data center. Although FIG. 2 shows a single network device 220, in practice, there may be hundreds, thousands, millions, etc. of network devices 220.

Network 230 includes one or more wired and/or wireless networks. For example, network 230 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
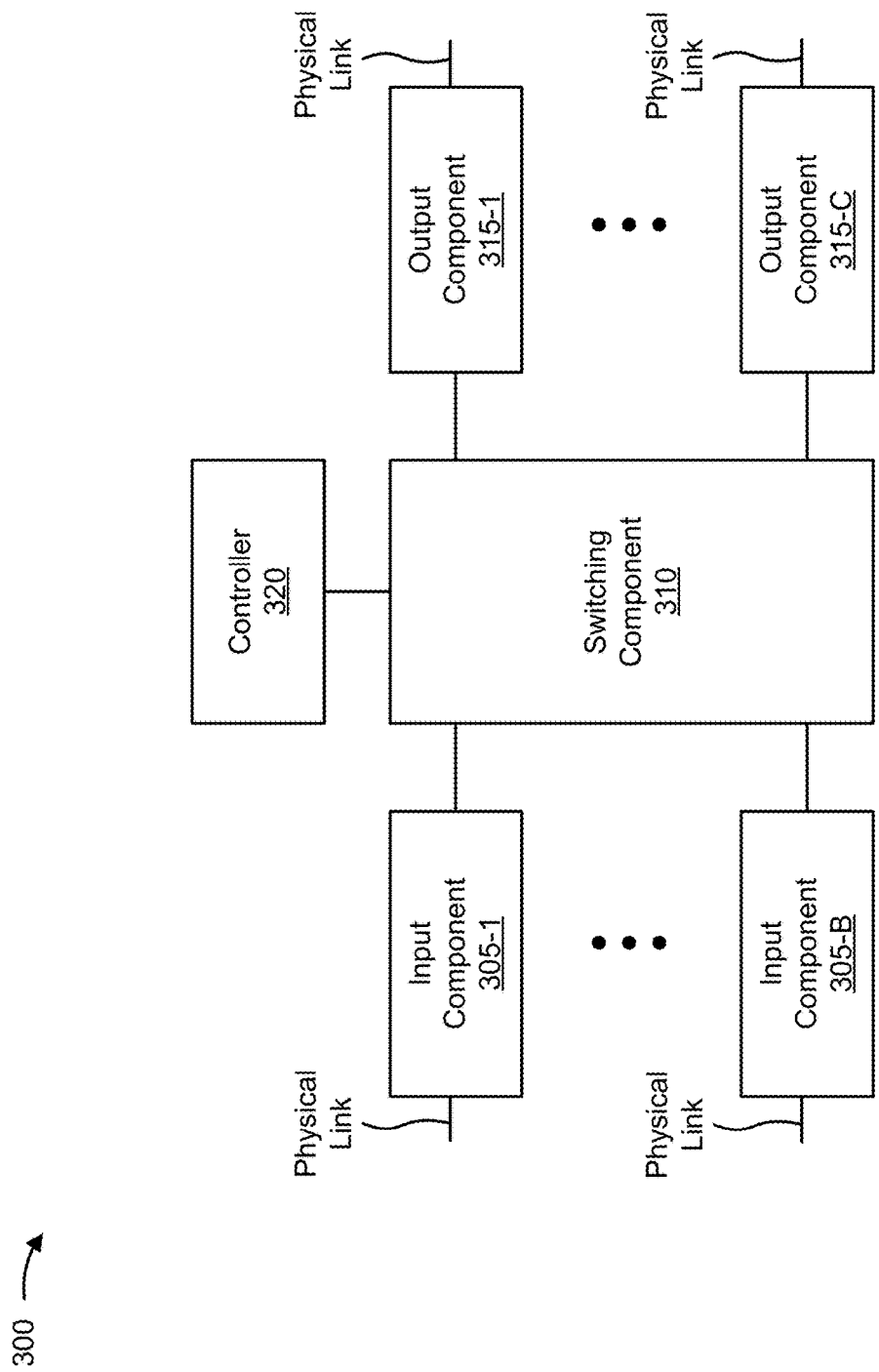
FIG. 3 is a diagram of example components of one or more devices of FIG. 2.

FIG. 3 is a diagram of example components of a device 300. Device 300 may correspond to client device 210 and/or network device 220. In some implementations, client device 210 and/or network device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, or an optical memory) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamic filtering of network traffic. In some implementations, one or more process blocks of FIG. 4 may be performed by network device 220. In some implementations, one or more process blocks of FIG. 4 may be performed by another device or a group of devices separate from or including network device 220, such as client device 210.

In some implementations, one or more process blocks of FIG. 4 may be performed by an input component and/or an output component (hereinafter referred to as "I/O component") of network device 220 (e.g., input component 305 and/or output component 315). In some implementations, the I/O component may include one or more packet forwarding components that can receive, process, and/or forward packets. Additionally, or alternatively, the I/O component may include one or more service components that can provide services to received packets. In some implementations, the packet forwarding component(s) and/or the service component(s) may perform one or more of the process blocks of FIG. 4. In some implementations, the service component may include an intrusion detection system that can monitor network traffic for suspicious activities. In this case, for example, the intrusion detection system may perform one or more of the process blocks of FIG. 4.

In some implementations, one or more process blocks of FIG. 4 may be performed by a controller of network device 220 (e.g., a controller 320). In some implementations, the controller may include one or more control components, such as background control elements (e.g., daemons), that can provide operational control of one or more components of network device 220 (e.g., an I/O component, a packet forwarding component, a service component, an intrusion detection system, and/or the like). In this case, for example, the controller may perform one or more of the process blocks of FIG. 4.

As shown in FIG. 4, process 400 may include receiving packets over a network (block 410). For example, network device 220 may receive (e.g., using the I/O component, the controller, and/or the like) packets over network 230. In some implementations, network device 220 may receive packets from one or more devices, such as client devices 210 and/or other network devices 220.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

In some implementations, a packet may include header information and payload information. In some implementations, the header information may include a source IP address (e.g., an IP address specified as being the source of the packet (a source subscriber), which may be an IP address that is associated with a device, such as a client device 210 or a network device 220, that actually initiated the packet, or may be a spoofed IP address that is associated with a device that did not actually initiate the packet), a source port identifier, a destination IP address (e.g., an IP address specified as the destination of the packet (a destination subscriber), which may be an IP address that is associated with a device, such as a client device or a network device), a destination port identifier, a time stamp, a protocol identifier, and/or other content.

In this way, network device 220 may receive packets over a network to cause network device 220 to determine that a rate of receipt of packets relating to a subscriber satisfies a threshold.

As further shown in FIG. 4, process 400 may include determining that a rate of receipt of packets relating to a subscriber satisfies a threshold (block 420). For example, network device 220 may determine (e.g., using the I/O component, the controller, and/or the like) that a rate of receipt of packets relating to a subscriber satisfies a threshold. In some implementations, network device 220 may determine that the rate of receipt of packets relating to the subscriber satisfies the threshold by comparing the rate of receipt of packets relating to the subscriber and the threshold.

In some implementations, the threshold (e.g., Ts and/or Td) may be set or configured by a user (e.g., a system administrator, a network administrator, and/or the like). Additionally, or alternatively, the threshold (e.g., Ts and/or Td) may be set or configured by network device 220.

In some implementations, the threshold may be a maximum rate at which packets, relating to any given subscriber (e.g., any given source subscriber or any given destination subscriber), are permitted to be received (e.g., by network device 220 and/or one or more components of network device 220). In this case, for example, a rate of receipt of packets, relating to a subscriber, that satisfies the threshold may be indicative of a potential attack involving that subscriber. In some implementations, the maximum rate may be a quantity of packets per unit time (e.g., per second, per four seconds, etc.).

In some implementations, individual thresholds may be defined for source subscribers and destination subscribers. For example, for source subscribers, a threshold Ts may be defined as a maximum rate at which packets, relating to any given source subscriber, are permitted to be received, and for destination subscribers, a threshold Td may be defined as a maximum rate at which packets, relating to any given destination subscriber, are permitted to be received. In some implementations, threshold Ts may be equal to threshold Td. Alternatively, threshold Ts may be different than threshold Td.

In some implementations, threshold Ts may be different for different source subscribers. For example, network device 220 may detect (e.g., based on user input, based on usage patterns, and/or the like) that a particular source subscriber is legitimately sending packets at a high rate. Continuing the example, network device 220 may set a higher threshold Ts for that source subscriber than for other source subscribers. Additionally, or alternatively, and in a similar fashion, threshold Td may be different for different destination subscribers.

In some implementations, the threshold (e.g., Ts and/or Td) may be set based on traffic patterns during normal operations. For example, where the rate of receipt of packets initiated from source subscribers, or destined to destination subscribers, typically does not exceed a certain quantity of packets per unit time (e.g., 8,000 packets per second (pps)) during normal operations, the threshold may be set based on that rate (e.g., the threshold may be set to a value slightly lower than 8,000 pps, such as 7,500 pps, or set to a value slightly higher than 8,000 pps, such as 8,500 pps).

Additionally, or alternatively, the threshold (e.g., Ts and/or Td) may be set based on characteristics of known attack methods. For example, where a particular attack is known to involve flooding of a target system with packets at a certain quantity of packets per unit time (e.g., 15,000 pps), the threshold may be set based on that rate (e.g., the threshold may be set to a value slightly lower than 15,000 pps, such as 14,500 pps).

In some implementations, the threshold (e.g., threshold Ts and/or Td) may be derived based on a user-provided value for the threshold, and a predefined value (e.g., 4, 6, 10, and/or the like). For example, where a user provides a value for the threshold, network device 220 may multiply the user-provided value by the predefined value (e.g., 4, 6, 10, and/or the like), and use the result of the multiplication as the threshold (e.g., as threshold Ts and/or Td). Continuing the example, where a user provides a value of 1,000 pps, and where the predefined value is 4, network device 220 may set the threshold to 4,000 pps (1,000 pps×4). In this way, network device 220 reduces or eliminates the possibility of the threshold being set at an unreasonably low value.

In some implementations, a maximum threshold value may be defined. For example, a maximum threshold of 1,000,000 pps, for any given source or destination subscriber, may be defined. In a case, for example, where a user provides an unreasonably high value for the threshold (e.g., 50,000,000 pps), the maximum threshold value may be used as the threshold (e.g., as threshold Ts and/or TO. In some implementations, network device 220 may use, as the threshold, the lower (e.g., the minimum) of the maximum threshold value and a user-provided value. For example, where the maximum threshold is 1,000,000 pps, and where a user-provided value is 1,000 pps, the threshold may be set to 1,000 pps (e.g., the minimum of 1,000,000 pps and 1,000 pps). As another example, where the maximum threshold value is 1,000,000 pps, where a user-provided value is 10,000 pps, and where the threshold is derived based on a user-provided value and the above-described predefined value (e.g., 4), the threshold may be set to 40,000 pps, which is the minimum of 1,000,000 pps and 40,000 pps (10,000 pps×4).

In some implementations, in addition, or as an alternative, to determining that a rate of receipt of packets relating to a subscriber satisfies a threshold, network device 220 may determine that a different rate relating to the subscriber satisfies a different threshold. For example, network device 220 may determine that a rate of flows relating to a subscriber (e.g., a rate of flows initiated by a source subscriber or a rate of flows destined to a destination subscriber) satisfies a corresponding threshold. In this case, the threshold may be a maximum rate at which flows, relating to any given subscriber (e.g., any given source subscriber or any given destination subscriber), are permitted to be received (e.g., quantity of flows per second). As another example, network device 220 may determine that a rate of network connection initiations relating to a subscriber satisfies a corresponding threshold. In this case, the threshold may be a maximum rate at which connections, relating to any given subscriber, are permitted to be initiated. Thus, some implementations described herein with respect to packets apply equally to flows, network connection initiations, and/or the like.

In this way, network device 220 may determine that a rate of receipt of packets relating to a subscriber satisfies a threshold to cause network device 220 to detect that a level of processor usage satisfies a threshold.

As further shown in FIG. 4, process 400 may include detecting that a level of processor usage satisfies a threshold (block 430). For example, network device 220 may detect (e.g., using the I/O component, the controller, and/or the like) that a level of processor usage satisfies a threshold. In some implementations, network device 220 may detect that the level of processor usage satisfies the threshold by comparing the level of processor usage with the threshold.

In some implementations, network device 220 may include one or more processors (e.g., included in one or more ASICs, FPGAs, and/or the like). In some implementations, the one or more processors may be included in a service component of network device 220 (e.g., a service component included in an I/O component of network device 220). In some implementations, network device 220 may detect that the level of processor usage satisfies the threshold based on information obtained regarding the status and/or current load of one or more processors of network device 220.

In some implementations, the threshold relating to processor usage may be set or configured by a user (e.g., a system administrator, a network administrator, and/or the like). Additionally, or alternatively, the threshold may be set or configured by network device 220.

In some implementations, the threshold may be the maximum permitted level of usage of a processor of the one or more processors. In some implementations, the threshold may be used in conjunction with the threshold described above with respect to block 420 (e.g., threshold Ts and/or threshold Td) to determine whether a high rate of receipt of packets relating to a subscriber (e.g., a source subscriber or a destination subscriber) may be overloading the processor, and thus may need to be addressed.

In some implementations, the level of processor usage and the threshold relating to processor usage may each be defined based on a percentage of the capacity of the processor that is in use. Alternatively, the level of processor usage and the threshold relating to processor usage may each be defined based on a percentage capacity of the processor that is not currently in use (e.g., currently free).

In some implementations, the threshold relating to processor usage may be set based on a level of processor usage that is typical during normal operations. For example, where the level of processor usage typically does not reach a certain percentage of the capacity of the processor (e.g., 95% of the capacity of the processor), the threshold may be set based on that level (e.g., the threshold may be set to a value slightly lower than 95%, such as 90%, or to a value slightly higher than 95%, such as 98%).

In this way, network device 220 may detect that a level of processor usage satisfies a threshold to cause network device 220 to perform one or more actions to cause filtering of packets relating to the subscriber.

As further shown in FIG. 4, process 400 may include performing one or more actions to cause filtering of packets relating to the subscriber (block 440). For example, network device 220 may perform (e.g., using the I/O component, the controller, and/or the like) one or more actions to cause filtering of packets relating to the subscriber. In some implementations, filtering of packets may include discarding the packets, blocking the packets, rejecting the packets, quarantining the packets, subjecting the packets to further analysis, and/or the like.

In some implementations, network device 220 may perform the one or more actions based on the threshold described above with respect to block 420 (e.g., the threshold relating to the rate of receipt of packets) being satisfied and/or based on the threshold described above with respect to block 430 (e.g., the threshold relating to level of processor usage) being satisfied. Alternatively, network device 220 may perform the one or more actions based only on the threshold described above with respect to block 420 being satisfied (e.g., regardless of whether the threshold described above with respect to block 430 is satisfied).

In some implementations, network device 220 may perform one or more actions to cause a filter (e.g., a firewall filter) to be provided in one or more components of network device 220. For example, a controller of network device 220 may cause the filter to be provided in the one or more components of network device 220. Continuing the example, the controller may cause the filter to be provided (e.g., installed, enabled, and/or the like) in a packet forwarding component of network device 220.

In some implementations, network device 220 may cause a filter to be provided to prevent packets relating to the subscriber from proceeding to one or more components of network device 220. For example, where the filter is provided in a packet forwarding component of network device 220, network device 220 may cause the filter to be provided to prevent packets relating to the subscriber from proceeding to one or more service components of network device 220.

In some implementations, the filter may include one or more terms (e.g., statements, rules, and/or conditions) that can be compared against information contained in received packets, and one or more associated actions, such as permitting a packet to pass or preventing the packet from passing, that can be performed based on the comparison(s). For example, the term(s) may be defined to determine whether a packet identifies a certain subscriber (e.g., IP address), such as a suspicious source or destination subscriber. Continuing the example, where a packet is determined to identify a suspicious source or destination subscriber, the filter may prevent the packet from passing.

In some implementations, and in a case where no filter currently exists, network device 220 may cause a new filter to be provided. Alternatively, in a case where a filter already exists, network device 220 may cause the filter to be modified to include one or more terms and one or more associated actions relating to the suspicious subscriber.

In some implementations, in a case where an intrusion detection system of network device 220 performs blocks 420 and/or 430 of process 400, and where a controller of network device 220 causes the filter to be provided, the intrusion detection system may provide information regarding the subscriber (e.g., information on whether the subscriber is a source subscriber or a destination subscriber) to the controller. Additionally, or alternatively, the intrusion detection system may provide, to the controller, the threshold relating to the maximum rate at which packets are permitted to be received (e.g., threshold Ts or Td, depending on whether the subscriber is a source subscriber or a destination subscriber).

In this way, network device 220 may dynamically filter traffic based on the rate of incoming traffic (e.g., packets) associated with a subscriber that may be involved in a potential attack and/or based on an amount of processing resources being used during such a potential attack. Additionally, network device 220 may perform one or more actions to cause filtering of packets relating to the subscriber to cause network device 220 to monitor filtering of packets relating to the subscriber to determine whether to maintain filtering of packets relating to the sub scriber.

As further shown in FIG. 4, process 400 may include monitoring filtering of packets relating to the subscriber to determine whether to maintain filtering of packets relating to the subscriber (block 450). For example, network device 220 may monitor (e.g., using the I/O component, the controller, and/or the like) filtering of packets relating to the subscriber to determine whether to maintain filtering of packets relating to the subscriber. In some implementations, network device 220 may monitor filtering of packets by obtaining information regarding the activities of the filter (e.g., by probing the filter and/or an associated component).

In some implementations, the information may include a rate at which the filter is filtering packets relating to the subscriber over a period of time. In this case, network device 220 may compare the rate of filtering with threshold Ts or Td, depending on whether the subscriber is a source subscriber or a destination subscriber. In some implementations, where the rate of filtering satisfies the threshold (e.g., is higher than threshold Ts or Td), network device 220 may maintain filtering of packets relating to the subscriber (e.g., to permit continued operation of the filter), since a large quantity of packets relating to the suspicious subscriber is still being received.

In some implementations, if the rate of filtering does not satisfy the threshold (e.g., is lower than threshold Ts or Td), network device 220 may determine that the subscriber is no longer suspicious, since, for example, much fewer packets relating to that subscriber are being received. In this case, network device 220 may modify the filtering (e.g., by suspending, disabling, and/or removing the filter). For example, network device 220 may modify the filtering by removing the term(s) in the filter that are associated with filtering packets relating to the subscriber.

In this way, network device 220 may monitor filtering of packets relating to the subscriber to determine whether to maintain filtering of packets relating to the subscriber.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
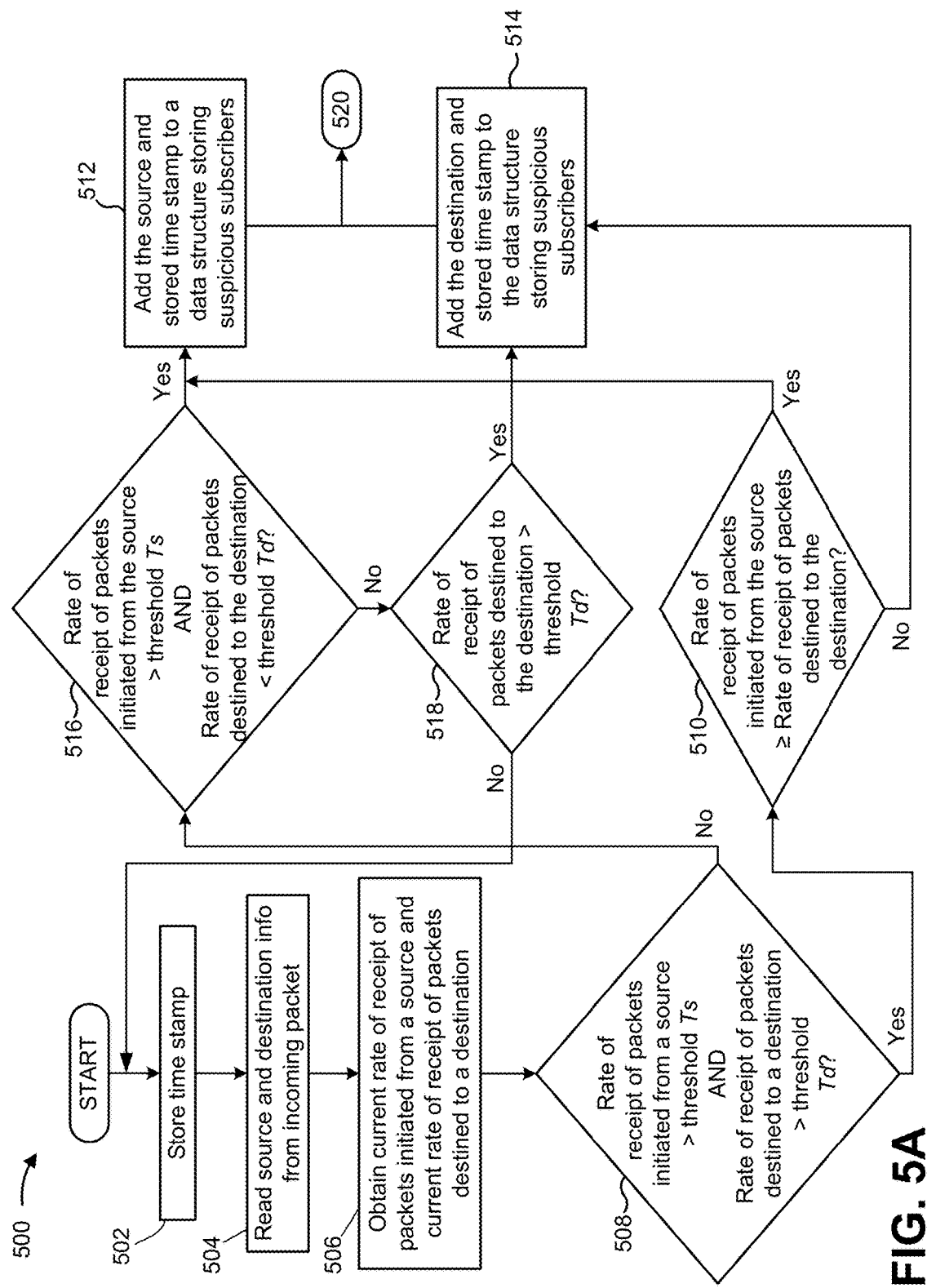
Figure 5C:
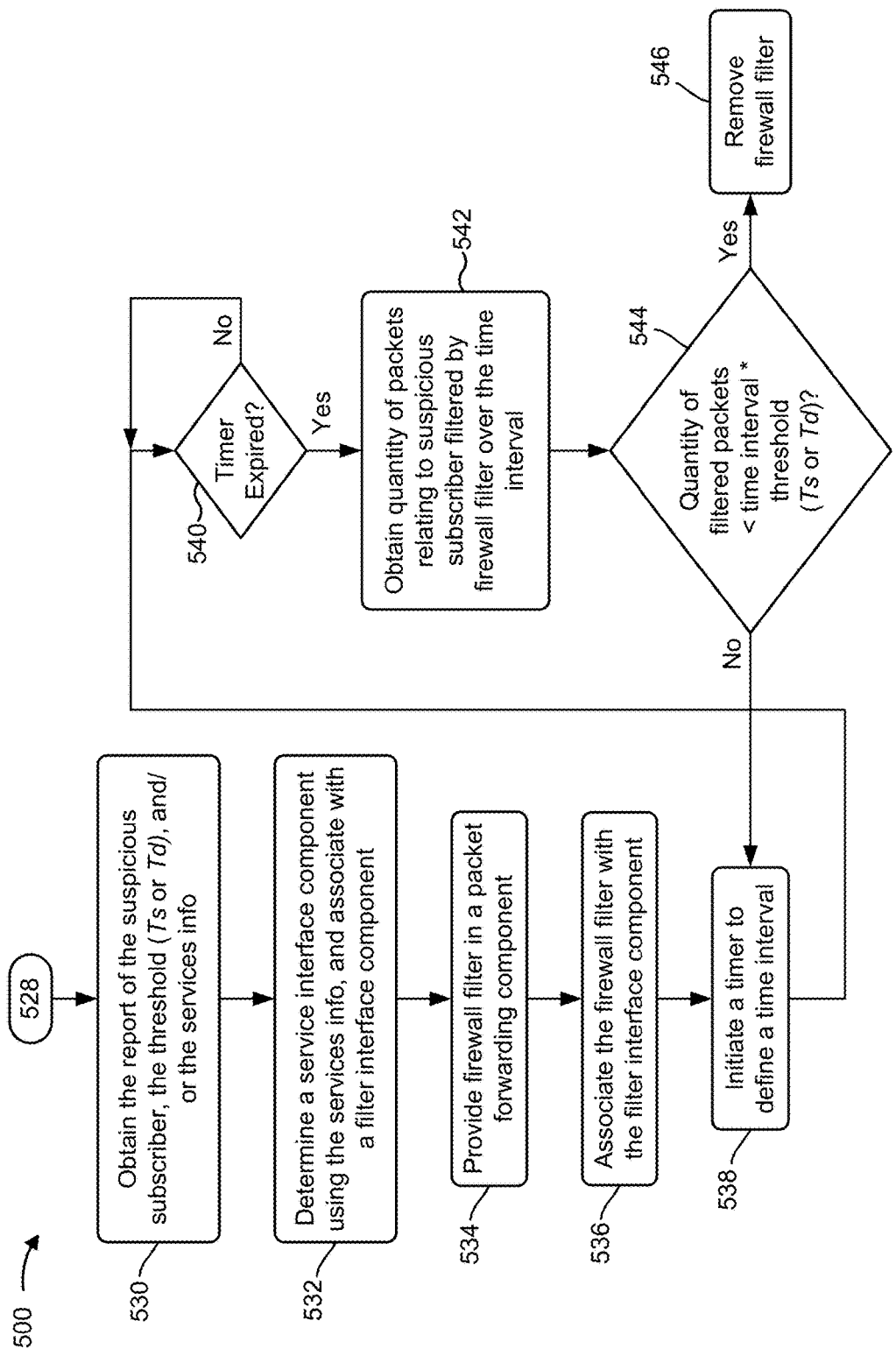

FIGS. 5A-5C are diagrams of an example process 500 relating to example process 400 shown in FIG. 4.

As shown in FIG. 5A, and as shown by reference number 502, network device 220 may store a time stamp based on the current time. For example, an intrusion detection system of network device 220 may store a time stamp based on the current time associated with a clock at a service component of network device 220. In some implementations, the time stamp may be in hh:mm:ss format.

As shown by reference number 504, network device 220 may read source and destination subscriber information from an incoming packet. For example, the intrusion detection system of network device 220 may read source and destination subscriber information from an incoming packet. In some implementations, the source and destination subscriber information may include IP address information.

As shown by reference number 506, network device 220 may obtain the current rate of receipt of packets initiated from a source subscriber and the current rate of receipt of packets destined to a destination subscriber. For example, the intrusion detection system of network device 220 may obtain the current rate of receipt of packets initiated from a source subscriber and the current rate of receipt of packets destined to a destination subscriber.

As shown by reference number 508, network device 220 may determine whether the current rate of receipt of packets initiated from the source subscriber satisfies a threshold Ts (e.g., is greater than a threshold Ts) and the current rate of receipt of packets destined to the destination subscriber satisfies a threshold Td (e.g., is greater than a threshold Td). For example, the intrusion detection system of network device 220 may determine whether the current rate of receipt of packets initiated from the source subscriber satisfies a threshold Ts (e.g., is greater than a threshold Ts) and the current rate of receipt of packets destined to the destination subscriber satisfies a threshold Td (e.g., is greater than a threshold Td). In some implementations, threshold Ts may be the maximum rate at which packets, relating to any given source subscriber, are permitted to be received, and threshold Td may be the maximum rate at which packets, relating to any given destination subscriber, are permitted to be received, as described elsewhere herein.

If network device 220 determines that the current rate of receipt of packets initiated from the source subscriber satisfies threshold Ts (e.g., is greater than threshold Ts) and the current rate of receipt of packets destined to the destination subscriber satisfies threshold Td (e.g., is greater than threshold Td) (reference number 508—YES), as shown by reference number 510, network device 220 may determine whether the current rate of receipt of packets initiated from the source subscriber is greater than or equal to the current rate of receipt of packets destined to the destination subscriber. For example, the intrusion detection system of network device 220 may determine whether the current rate of receipt of packets initiated from the source subscriber is greater than or equal to the current rate of receipt of packets destined to the destination subscriber.

If network device 220 determines that the current rate of receipt of packets initiated from the source subscriber is greater than or equal to the current rate of receipt of packets destined to the destination subscriber (reference number 510—YES), as shown by reference number 512, network device 220 may add the source subscriber and the stored time stamp to a data structure storing suspicious subscribers, and process 500 may proceed to reference number 520. For example, the intrusion detection system may add the source subscriber and the stored time stamp to a data structure (e.g., a list, a table, or another type of data structure) that stores information regarding suspicious subscribers. In some implementations, network device 220 may add, to the data structure, an indication that the suspicious subscriber is a source subscriber (e.g., by using a designator, such as "src"), the rate of receipt of packets initiated from the suspicious subscriber, information regarding one or more sets of services (e.g., relating to source subscribers), and/or the like. In some implementations, the set(s) of services may be a predefined collection of services provided by network device 220, such as by a service component of network device 220. In some implementations, the set(s) of services may be set or configured by a user (e.g., a system or network administrator) or another device (e.g., a network management device).

If network device 220 determines that the current rate of receipt of packets initiated from the source subscriber is not greater than or equal to the current rate of receipt of packets destined to the destination subscriber (reference number 510—NO), as shown by reference number 514, network device 220 may add the destination subscriber and the stored time stamp to the data structure, and process 500 may proceed to reference number 520. For example, the intrusion detection system of network device 220 may add the destination subscriber and the stored time stamp to the data structure. In some implementations, network device 220 may add, to the data structure, an indication that the suspicious subscriber is a destination subscriber (e.g., by using a designator, such as "dest"), the rate of receipt of packets destined to the suspicious subscriber, information regarding the one or more sets of services (e.g., relating to destination subscribers), and/or the like.

If network device 220 determines that the current rate of receipt of packets initiated from the source subscriber does not satisfy threshold Ts (e.g., is not greater than threshold Ts) and the current rate of receipt of packets destined to the destination subscriber does not satisfy threshold Td (e.g., is not greater than threshold Td) (reference number 508—NO), as shown by reference number 516, network device 220 may determine whether the current rate of receipt of packets initiated from the source subscriber satisfies threshold Ts (e.g., is greater than threshold Ts) and the current rate of receipt of packets destined to the destination subscriber satisfies threshold Td (e.g., is less than threshold Td). For example, the intrusion detection system of network device 220 may determine whether the current rate of receipt of packets initiated from the source subscriber is greater than threshold Ts and the current rate of receipt of packets destined to the destination subscriber is less than threshold Td.

If network device 220 determines that the current rate of receipt of packets initiated from the source subscriber satisfies threshold Ts (e.g., is greater than threshold Ts) and the current rate of receipt of packets destined to the destination subscriber satisfies threshold Td (e.g., is less than threshold Td) (reference number 516—YES), as shown by reference number 512, network device 220 may add the source subscriber and the stored time stamp to the data structure, and process 500 may proceed to reference number 520. For example, the intrusion detection system may add the source subscriber and the stored time stamp to the data structure.

If network device 220 determines that the current rate of receipt of packets initiated from the source subscriber does not satisfy threshold Ts (e.g., is not greater than threshold Ts) and the current rate of receipt of packets destined to the destination subscriber does not satisfy threshold Td (e.g., is not less than threshold Td) (reference number 516—NO), as shown by reference number 518, network device 220 may determine whether the current rate of receipt of packets destined to the destination subscriber satisfies threshold Td (e.g., is greater than threshold Td). For example, the intrusion detection system of network device 220 may determine whether the current rate of receipt of packets destined to the destination subscriber is greater than threshold Td.

If network device 220 determines that the current rate of receipt of packets destined to the destination subscriber does not satisfy threshold Td (e.g., is not greater than threshold Td) (reference number 518—NO), process 500 may return to reference number 502. If network device 220 determines that the current rate of receipt of packets destined to the destination subscriber satisfies threshold Td (e.g., is greater than threshold Td) (reference number 518—YES), as shown by reference number 514, network device 220 may add the destination subscriber and the stored time stamp to the data structure, and process 500 may proceed to reference number 520. For example, the intrusion detection system of network device 220 may add the destination subscriber and the stored time stamp to the data structure. In this way, network device 220 heuristically identifies suspicious subscribers (whether the subscribers are attackers or targets) to determine whether action(s) need to be taken against these subscribers and/or packets relating to these subscribers.

As shown in FIG. 5B, and as shown by reference number 520, network device 220 may determine whether the data structure is not empty and the level of processor usage satisfies a threshold P (e.g., is greater than a threshold P). For example, the intrusion detection system may determine whether the data structure is not empty and the level of processor usage is greater than a threshold P. In some implementations, threshold P may be the maximum permitted level of usage of one or more processors of network device 220, as described elsewhere herein.

If network device 220 determines that the data structure is empty and the level of processor usage does not satisfy threshold P (e.g., is not greater than threshold P) (reference number 520—NO), process 500 may return to reference number 520. If network device 220 determines that the data structure is not empty and the level of processor usage satisfies threshold P (e.g., is greater than threshold P) (reference number 520—YES), as shown by reference number 522, network device 220 may store a time stamp based on the current time. For example, the intrusion detection system of network device 220 may store a time stamp based on the current time associated with a clock at a service component of network device 220.

As shown by reference number 524, network device 220 may obtain, from the data structure, the most-recently added suspicious subscriber and the stored time stamp associated with the suspicious subscriber, and remove the most-recently added suspicious subscriber from the data structure. For example, the intrusion detection system of network device 220 may obtain, from the data structure, the most-recently added suspicious subscriber and the associated stored time stamp, and remove the most-recently added suspicious subscriber from the data structure.

As shown by reference number 526, network device 220 may determine whether a difference between the stored time stamp (from reference number 522) and the stored time stamp associated with the most-recently added suspicious subscriber (that has been removed from the data structure) is less than a predefined value. For example, the intrusion detection system of network device 220 may determine whether a difference between the stored time stamp (from reference number 522) and the stored time associated with the most-recently added suspicious subscriber (that has been removed from the data structure) is less than a predefined value. In some implementations, the predefined value may be a number of seconds (e.g., 4 seconds, 7 seconds, and/or the like). In a case where network device 220 determines that the difference between the stored time stamp (from reference number 522) and the stored time associated with the most-recently added suspicious subscriber (that has been removed from the data structure) is less than the predefined value (e.g., is less than 4 seconds), network device 220 may determine that the high rate of receipt of packets relating to the suspicious subscriber is likely the cause of processor overloading (e.g., since the overload condition resulted shortly after a high rate of receipt of packets relating to the suspicious subscriber was detected).

In some implementations, network device 220 may determine whether the difference between the stored time stamp (from reference number 522) and the stored time associated with the most-recently added suspicious subscriber (that has been removed from the data structure) satisfies a threshold. For example, and as an alternative to determining whether the difference is less than a predefined value, as described above, network device 220 may determine whether the difference is not greater than the predefined value.

If network device 220 determines that the difference between the stored time stamp (from reference number 522) and the stored time associated with the most-recently added suspicious subscriber (that has been removed from the data structure) is not less than the predefined value (reference number 526—NO), process 500 may return to reference number 520.

If network device 220 determines that the difference between the stored time stamp (from reference number 522) and the stored time associated with the most-recently added suspicious subscriber (that has been removed from the data structure) is less than the predefined value (reference number 526—YES), as shown by reference number 528, network device 220 may report the suspicious subscriber, provide threshold Ts or Td (depending on whether the suspicious subscriber is a source subscriber or a destination subscriber), and/or provide the information regarding the one or more sets of services (relating to sources or destinations, depending on whether the suspicious subscriber is a source subscriber or a destination subscriber), and process 500 may proceed to reference number 530. For example, the intrusion detection system of network device 220 may report (e.g., via one or more indications) the suspicious subscriber, provide threshold Ts or Td, and/or information regarding the one or more sets of services. In some implementations, the intrusion detection system may report the suspicious subscriber to a controller of network device 220 (e.g., to a control daemon or other control element and/or process of the controller, via a communication path that may be established at the request of the intrusion detection system to the controller). In some implementations, network device 220 may include, in the report, some or all of the information regarding the suspicious subscriber previously read from the data structure (e.g., the indication of whether the suspicious subscriber is a source subscriber or a destination subscriber, the time stamp associated with the suspicious subscriber, etc.).

As shown in FIG. 5C, and as shown by reference number 530, network device 220 may receive the suspicious subscriber information, the threshold (threshold Ts or Td), and/or the information regarding the one or more sets of services. For example, the controller of network device 220 may receive the suspicious subscriber information, the threshold (threshold Ts or Td), and/or the information regarding the one or more sets of services.

As shown by reference number 532, network device 220 may determine (e.g., extract) a service interface component based on the information regarding the one or more sets of services, and associate the service interface component with a filter interface component. For example, the controller of network device 220 may extract a service interface component based on the information regarding the one or more sets of services, and associate the service interface component with a filter interface component. In some implementations, the controller may access the one or more sets of services to identify a service interface component (e.g., a logical unit or element) associated with the service component of network device 220. Additionally, or alternatively, controller 320 may access a filter interface component (e.g., a logical unit or component) associated with establishing firewalls in network device 220 (e.g., in a packet forwarding component of network device 220).

As shown by reference number 534, network device 220 may provide a firewall filter in a packet forwarding component of network device 220. For example, the controller of network device 220 may install a firewall filter in the packet forwarding component to filter (e.g., via one or more filter terms associated with the suspicious subscriber) packets initiated by the suspicious subscriber (e.g., in a case where the suspicious subscriber is a source subscriber) or destined to the suspicious subscriber (e.g., in a case where the suspicious subscriber is a destination subscriber).

As shown by reference number 536, network device 220 may associate the firewall filter with the filter interface component (e.g., by attaching the firewall filter to the filter interface component). As shown by reference number 538, network device 220 may initiate a timer to define a time interval. For example, the controller of network device 220 may initiate a timer to define a time interval. In some implementations, the time interval may be a number of seconds (e.g., 20 seconds, 30 seconds, 60 seconds, and/or the like). In some implementations, the timer may be defined for purposes of performing a status check on the firewall filter regarding filtering of packets relating to the suspicious subscriber.

As shown by reference number 540, network device 220 may determine whether the timer has expired. For example, the controller of network device 220 may determine whether the timer has expired. If network device 220 determines that the timer has not expired (reference number 540—NO), process 500 may return to reference number 540. If network device 220 determines that the timer has expired (reference number 540—YES), as shown by reference number 542, network device 220 may obtain the quantity of packets, relating to the suspicious subscriber (e.g., the quantity of packets initiated by the suspicious subscriber in a case where the suspicious subscriber is a source subscriber, or the quantity of packets destined to the suspicious subscriber in a case where the suspicious subscriber is a destination subscriber), filtered by the firewall filter over the time interval. For example, the controller of network device 220 may obtain the quantity of packets, relating to the suspicious subscriber, filtered by the firewall filter over the time interval.

As shown by reference number 544, network device 220 may determine whether the quantity of packets, relating to the suspicious subscriber, filtered by the firewall filter over the time interval is less than the value of the time interval multiplied by the threshold (threshold Ts or Td). For example, the controller of network device 220 may determine whether the quantity of packets relating to the suspicious subscriber filtered by the firewall filter over the time interval is less than the value of the time interval multiplied by the threshold (threshold Ts or Td).

If network device 220 determines that the quantity of packets, relating to the suspicious subscriber, filtered by the firewall filter over the time interval is not less than the value of the time interval multiplied by the threshold (threshold Ts or Td) (reference number 544—NO), process 500 may return to reference number 538. If network device 220 determines that the quantity of packets, relating to the suspicious subscriber, filtered by the firewall filter over the time interval is less than the value of the time interval multiplied by the threshold (threshold Ts or Td) (reference number 544—YES), as shown by reference number 546, network device 220 may remove the firewall filter. For example, the controller of network device 220 may remove the firewall filter from the packet forwarding component (e.g., by deleting the term(s) relating to the suspicious subscriber from the firewall filter).

In some implementations, reference numbers 538-546, as described above, may ensure that packets relating to the suspicious subscriber will not be filtered indefinitely. In this way, where it is likely that the suspicious subscriber is no longer involved in a potential attack (due to, for example, much fewer packets relating to the suspicious subscriber being received and filtered), packets relating to the suspicious subscriber will be permitted to pass once again.

In some implementations, where a filter, such as a firewall filter, is installed for the suspicious subscriber, where packets relating to the suspicious subscriber (e.g., packets initiated from the suspicious subscriber in a case where the suspicious subscriber is a source subscriber, or packets destined to the suspicious subscriber in a case where the suspicious subscriber is a destination subscriber) are still being received at a rate that satisfies the threshold (threshold Ts or Td), and where a level of processor usage satisfies threshold P, network device 220 may continue to determine the subscriber as suspicious. For example, the intrusion detection system may continue to report the subscriber as suspicious to the controller. In this way, network device 220 remains cognizant of the suspicious subscriber and can take one or more actions against the suspicious subscriber, such as, for example, reinstalling a firewall filter to filter packets relating to the suspicious subscriber should the firewall filter be unintentionally removed, or the like.

Although FIGS. 5A-5C show example blocks of process 500, in some implementations, process 500 may include additional blocks, fewer blocks, different blocks, or differently arranged blocks than those depicted in FIGS. 5A-5C. Additionally, or alternatively, two or more of the blocks of process 500 may be performed in parallel.

Some implementations, described herein, provide a device (e.g., a network device) that is capable of thwarting malicious attacks conducted over a network by using one or more filters dynamically provided based on the rate of incoming traffic (e.g., packets) associated with a subscriber that may be involved in a potential attack and/or based on an amount of processing resources being used during such a potential attack. In this way, the device (e.g., the network device) dynamically adjusts to potential attacks as needed. This reduces or eliminates a need to process and/or forward packets related to a potential attack, which conserves processing and/or memory resources of the device, and permits the device, including various components of the device, such as one or more service components, to remain operational and continue providing services for other packets that are received. In addition, this maintains the integrity of the network, reduces the likelihood that a target system of the attack will become inoperable, and/or reduces or eliminates a need for a network or system administrator to intervene (such as to restart the device and/or one or more device(s) at the target system).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
receive a plurality of packets over a network,
where packets, of the plurality of packets, relate to a subscriber,
the subscriber being a source subscriber from which the packets are initiated or a destination subscriber to which the packets are destined;
determine whether a rate of receipt of the packets satisfies a first threshold;
detect whether a level of processor usage satisfies a second threshold;
determine that a difference, between a time at which the rate of receipt of the packets is determined to satisfy the first threshold and a time at which the level of processor usage is detected to satisfy the second threshold, satisfies a third threshold;
perform one or more actions to cause filtering of additional packets relating to the subscriber based on determining that the difference satisfies the third threshold; and
monitor the filtering to determine whether to filter further packets relating to the subscriber.

2. The device of claim 1, where the subscriber is an Internet Protocol (IP) address.

3. The device of claim 1, where the subscriber is the source subscriber, and where the first threshold is a maximum rate at which packets, related to the source subscriber, are permitted to be received by the device.

4. The device of claim 1, where the subscriber is the destination subscriber, and where the first threshold is a maximum rate at which packets, related to the destination subscriber, are permitted to be received by the device.

5. The device of claim 1, where the one or more processors are further to:
process the plurality of packets to read information regarding a source subscriber of each of the plurality of packets, or information regarding a destination subscriber of each of the plurality of packets.

6. The device of claim 1, where the one or more processors, when detecting whether the level of processor usage satisfies the second threshold, are to:
obtain information regarding a current load on at least one processor of the device.

7. The device of claim 1, where the one or more processors are further to:
determine that the subscriber is a suspicious subscriber based on determining that the rate of receipt of the packets satisfies the first threshold and detecting that the level of processor usage satisfies the second threshold; and where the one or more processors, when performing the one or more actions to cause the filtering of the packets, are to:
  perform the one or more actions based on determining that the subscriber is a suspicious subscriber.

8. A non-transitory computer-readable medium storing instructions, the instructions comprising:
  one or more instructions that, when executed by one or more processors, cause the one or more processors to:
    process a plurality of packets received over a network,
      where packets, of the plurality of packets, relate to a subscriber,
        the subscriber being a source subscriber from which the packets are initiated or a destination subscriber to which the packets are destined;
    determine that a rate of receipt of the packets satisfies a first threshold;
    determine that a rate of receipt of the packets relating to the source subscriber exceeds a rate of receipt of packets relating to the destination subscriber or that a rate of receipt of the packets relating to the destination subscriber exceeds a rate of receipt of the packets relating to the source subscriber;
    perform one or more actions to cause blocking of additional packets relating to the subscriber based on determining that the rate of receipt of the packets satisfies the first threshold and based on determining that the rate of receipt of the packets relating to the source subscriber exceeds the rate of receipt of packets relating to the destination subscriber or based on determining that the rate of receipt of the packets relating to the destination subscriber exceeds the rate of receipt of packets relating to the source subscriber; and
    monitor the blocking to determine whether to block further packets relating to the subscriber.

9. The non-transitory computer-readable medium of claim 8, where the one or more instructions, when executed by the one or more processors, further cause the one or more processors to:
  detect that a level of processor usage satisfies a second threshold;
  determine that a difference, between a time at which the rate of receipt of the packets is determined to satisfy the first threshold and a time at which the level of processor usage is detected to satisfy the second threshold, satisfies a third threshold; and
  where the one or more instructions, that cause the one or more processors to perform the one or more actions to cause blocking of the additional packets, cause the one or more processors to:
    perform the one or more actions based on determining that the difference satisfies the third threshold.

10. The non-transitory computer-readable medium of claim 8, where the one or more instructions, that cause the one or more processors to perform the one or more actions to cause blocking of the additional packets, cause the one or more processors to:
  provide a firewall filter to block the additional packets.

11. The non-transitory computer-readable medium of claim 10, where the subscriber is the source subscriber, and where the one or more instructions, that cause the one or more processors to provide the firewall filter to block the additional packets, cause the one or more processors to:
  provide the firewall filter to block the additional packets initiated from the subscriber.

12. The non-transitory computer-readable medium of claim 10, where the subscriber is the destination subscriber, and where the one or more instructions, that cause the one or more processors to provide the firewall filter to block the additional packets, cause the one or more processors to:
  provide the firewall filter to block the additional packets destined to the subscriber.

13. The non-transitory computer-readable medium of claim 8, further cause the one or more processors to:
  process the plurality of packets to read information regarding a source subscriber of each of the plurality of packets, or information regarding a destination subscriber of each of the plurality of packets.

14. The non-transitory computer-readable medium of claim 8, further cause the one or more processors to:
  provide an indication that the subscriber is a suspicious subscriber.

15. A method, comprising:
  receiving, by a device, a plurality of packets over a network,
    the device including:
      a controller,
      a packet forwarding component to process or forward one or more of the plurality of packets, and
      a service component to provide one or more services relating to one or more of the plurality of packets;
  determining, by the device, whether a rate of receipt of packets, of the plurality of packets and relating to a subscriber, satisfies a first threshold,
    the subscriber being a source subscriber from which the packets are initiated or a destination subscriber to which the packets are destined;
  detecting, by the device, whether a level of processor usage satisfies a second threshold;
  determining, by the device, that a difference, between a time at which the rate of receipt of the packets is determined to satisfy the first threshold and a time at which the level of processor usage is detected to satisfy the second threshold, satisfies a third threshold;
  providing, by the device, a filter to filter additional packets relating to the subscriber based on determining that the difference satisfies the third threshold; and
  maintaining or disabling, by the device, the filter based on an activity of the filter.

16. The method of claim 15, where determining whether the rate of receipt of the packets satisfies the first threshold comprises:
  determining, by the service component, that the rate of receipt of the packets satisfies the first threshold.

17. The method of claim 15, where detecting whether the level of processor usage satisfies the second threshold comprises:
  detecting, by the service component, that the level of processor usage satisfies the second threshold.

18. The method of claim 15, further comprising:
  providing, by the service component and to the controller, an indication that the subscriber is a suspicious subscriber.

19. The method of claim 15, where providing the filter to filter the additional packets comprises:
  providing, by the controller, the filter in the packet forwarding component.

20. The method of claim 19, where providing the filter in the packet forwarding component comprises:

providing, by the controller, the filter in the packet forwarding component to prevent the additional packets from proceeding to the service component.

* * * * *